United States Patent

Fifer

[15] 3,655,050
[45] Apr. 11, 1972

[54] MEANS FOR AUTOMATICALLY OPERATING SEWAGE TREATMENT UNITS

[72] Inventor: Rolland L. Fifer, 6211 Glen Hill Road, Louisville, Ky. 40222

[22] Filed: Oct. 1, 1970

[21] Appl. No.: 77,203

[52] U.S. Cl..................210/86, 210/120, 210/125, 210/139, 210/218
[51] Int. Cl..........................................C02c 1/06
[58] Field of Search..................210/86, 120, 125, 139, 218

[56] References Cited

UNITED STATES PATENTS 3,482,695   12/1969   Hansen et al.................210/86

*Primary Examiner*—Frank A. Spear, Jr.
*Attorney*—Norman L. Winson, Jr.

[57] ABSTRACT

Means are provided for operating the sewage treatment units described in U.S. Pat. Nos. 3,476,250 and 3,460,677 completely automatically. Two timed operating cycles are employed. A purifying chemical is injected to the purified effluent from a chemical dispenser. The dispenser is filled from a hopper. It is necessary only to add purifying chemical to the hopper when a signal is activated indicating that the hopper is empty.

8 Claims, 3 Drawing Figures

PATENTED APR 11 1972 3,655,050
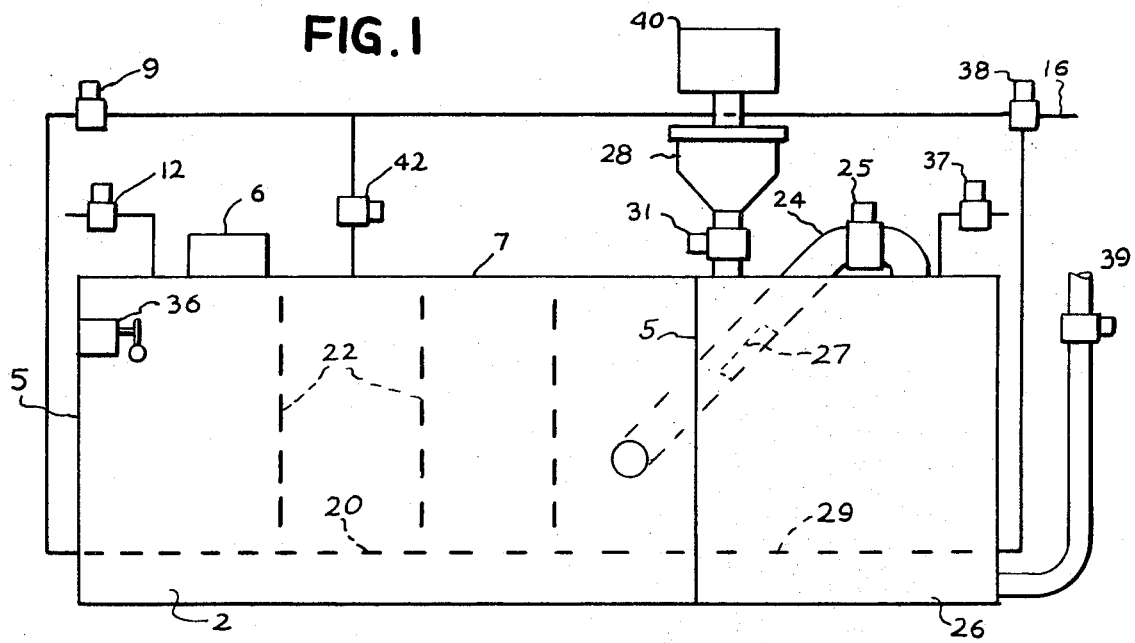
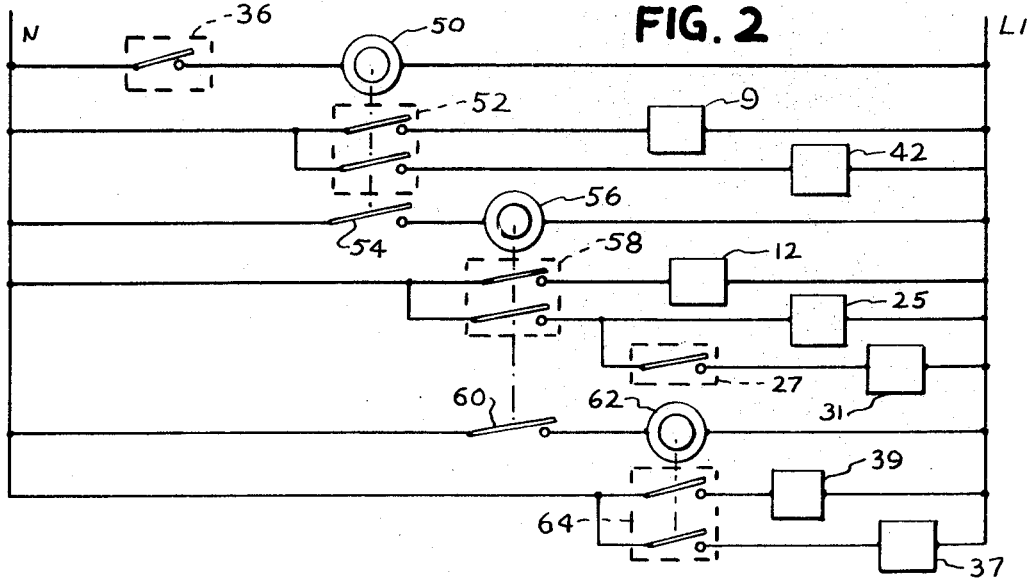
INVENTOR.
ROLLAND L. FIFER
BY Norman L. Wilson Jr.
HIS ATTORNEY

MEANS FOR AUTOMATICALLY OPERATING SEWAGE TREATMENT UNITS

BACKGROUND OF THE INVENTION

The present invention relates to waste treatment plants of the activated sludge type.

In the activated sludge treatment of sewage the method of treatment involves the use of a tank in which sewage is mixed with previously activated sludge and subjected to the action of bacteria. This aerobic treatment is usually carried out in large tanks. Ordinarily the speed of movement of sewage through the tank is slow so that the sewage will remain in the tank a sufficient length of time to allow the bacteria to properly act upon the sewage. Since oxygen is necessary for bacterial action, air distributing means are employed, and these means are usually so arranged as to make it possible for the sewage to receive and absorb from the air as much oxygen as is necessary to support the bacterial action. In order to procure proper action it is also essential to keep the body of sewage in substantially constant movement to avoid any settling or separating out of heavier or more solid particles. Aerobic treatment tanks must, then, be so constructed as to perform the functions of circulation and mixing for a period of time sufficient to purify the material so that the effluent therefrom has a safe biological oxygen demand (B.O.D.).

Sewage aeration tanks are usually at least as high, and generally two to five times as high, as they are wide, with air being introduced at various points in the tank, usually near the bottom. In addition they are two to 10 times as long as they are wide. These dimensions have been necessary in order that the air introduced will circulate sufficiently to keep solid matter in suspension, and to prevent settling of solids. For these reasons it has not been possible to depart drastically from the minimum height to width to length ratios, length being its longer dimension, width its shorter.

As described in my U.S. Pat. Nos. 3,476,250 and 3,460,677, a sewage treatment unit can be made where the available height dimension is shorter than the length dimension, and frequently shorter than both length and width. In such sewage treatment apparatus, having a single aeration tank so elongated that its length exceeds its height, in order to achieve a circulation pattern resulting in minimization of quiescent areas, the chamber was divided by the use of at least one substantially vertical impermeable baffle panel interposed between one pair of opposite tank walls. This arrangement results in a plurality of aeration chambers formed by the baffle panels, the number of baffle panels interposed being such that no aeration chamber operates with width to height ratio greater than one. In the aeration tank which is described in my patents the baffles terminate above the tank bottom so that each aerating chamber communicates with an adjacent chamber. A single open zone of communication is thus formed beneath the baffles. A similar zone is formed above the panels since they terminate below the chamber top. In combination with the baffles air distributor means are employed in each aerating chamber so that the locus of the introduction of the air is along the entire length of the chamber relative to or parallel to the baffle panel so that air bubbles circulating therein create a circulating pattern on each side of a baffle throughout each circulating chamber.

Since my sewage treatment apparatus will frequently be installed in buses, boats, floating docks, and aircraft, the apparatus will often be subjected to a rocking action. Accordingly to mitigate sloshing of the sewage suspension during rocking the use of auxiliary panels is preferred, so constructed that disturbance of the circulation pattern within the aeration tank is minimal. It was found that auxiliary panels, projecting from the main baffle panel, and having openings in their walls function as solid panels, and therefore confine the liquid in separate chambers, if flow passages therethrough are irregularly spaced, and if their total cross-sectional area is less than one-third of the total cross-sectional area of the panel.

The operation of the two sewage treatment units of U.S. Pat. Nos. 3,476,250 and 3,460,677, has been described in terms of batchwise operation in those patents, operation to be effected manually. Thus, when on visible inspection the aeration chamber was full, it was aerated for an additional period, allowed to settle, and then pumping or other means were activated to transfer the effluent to a purification chamber. This operation is subject to several disadvantages, the primary one from the commercial point of view being neglect. If the boat owner fails to turn on the air or to transfer the effluent, the unit will be unsatisfactory. In accordance with the practice of this invention means are provided so that operation of either of the two units described in my patents is completely automatic. It is necessary only to add a purifying chemical or solution, such as a chlorine compound, to a hopper when a signal is activated indicating that the hopper is empty.

SUMMARY OF THE INVENTION

This invention thus provides means for automatically operating the sewage treatment units described in U.S. Pat. Nos. 3,476,250 and 3,460,677 which are incorporated herein by reference. Air for aerobic biological action is admitted to the aeration tank through valve means having a single air inlet and two air outlets, one normally open and one normally closed. Air conduit means connects the normally open outlet to the air distributor means, and the normally closed outlet to the communication zone above the liquid in the aeration tank. The tank has a sealed top closure with an air vent in it with valve means capable of being closed to seal the tank. When the aeration tank is full, liquid level responsive means such as a liquid level switch activates means for automatically controlling the operation of the valves through timed operating cycles. During the first timed cycle, after an aeration period the air inlet valve is activated to close the air diffuser conduit means and to open the conduit means connected with the upper communication zone. During the second timed cycle, after a settling period the effluent outlet valve is opened, and the aeration tank vent valve is closed. This forces air into the upper portion of the tank above the liquid in the aeration chamber to drive said liquid into the effluent outlet by virtue of the air pressure on the surface thereof without disturbing the zone of communication beneath the baffle panel. At the end of the second timed cycle, after an emptying period, the valves resume their normal positions. A chemical injector is operably connected to the purification tank automatically to dispense a purifying chemical into the purification chamber as effluent is transferred from the aeration tank to the purification tank.

DETAILED DESCRIPTION OF THE INVENTION

The invention herein provides automatic control means for a portable sewage treatment unit designed to control the operation of the unit in such manner that only periodic servicing is required. Thus it will be necessary only at intervals to add chlorine or other water purifying compound to the purifier holding tank, and at much less frequent intervals to remove sediment from the aeration tank floor. For a better understanding of the invention reference may be had to the accompanying drawing in which:

FIG. 1 is a schematic representation of a unit of U.S. Pat. No. 3,460,677 showing an adaptation of the invention.

FIG. 2 diagrammatically illustrates a control circuit of the present invention.

FIG. 3 is a time chart or sequence diagram showing the relative operation of the valves employed in the control circuit.

In order that the operation of the unit may be readily understood the sewage or wastewater itself will first be briefly described. Referring then to FIG. 1, an elongated aeration tank 2 is schematically shown with ends 5, a top 7, and a bottom adapted with fillets at the junctures as is known in the art. Desired air circulation is achieved by partitioning the tank into a plurality of aeration chambers with at least one dividing baffle panel as described in U.S. Pat. Nos. 3,476,250 and 3,460,677. A zone of communication is formed above and also below the baffles.

To maintain a uniform circulation throughout aeration tank 2, and to prevent or minimize dead spots or quiescent zones, the air distributors are positioned near or at the chamber bottom. A particularly desirable air distributor pipe is an orifice tube 20. IF desired a plurality of auxiliary panels 22 project laterally from the general plane of the dividing baffle. These panels mitigate sloshing.

An effluent withdrawal line 24 leads from aeration tank 2 to a purification tank 26 so that last traces of impurities in the effluent can be further purified by air and chemicals from dispensing means or chlorinator 28.

We shall now discuss means for automatically operating sewage treatment plants of the type disclosed in U.S. Pat. Nos. 3,476,250 and 3,460,677. However it should first be pointed out that the treatment plants are closed units capable of being made air tight. At the time sewage enters aeration tank 2 through pipe 6, air is being brought in through air inlet line 16, and by valve 9 is diverted to air distributing tube 20 suitably placed. Air vent valve 12 is opened during operation so that there will be no pressure buildup within the tank. Outlet conduit 24 is provided for the withdrawal of effluent from the tank after it has been allowed to settle, the conduit being so placed that solids-bearing liquid remains in chamber 2 for bacterial retention.

To operate purification chamber 26 a chemical purifier 28 is provided so that a chemical such as a chlorine compound is introduced through valve 31. In addition valve 38 is opened so that air, which mixes and additionally purifies, is introduced through header 29 in the bottom of purification tank 26. Tank 26 is also provided with a vent valve, for instance 37.

To empty either chamber 2 or chamber 26 its vent valve, 12 or 37 respectively, is closed. The air fills the space above the liquid in the chamber and then forces the purified effluent through its effluent outlet.

Electrical control circuitry for automatically controlling the operation of the sewage treatment plant is illustrated in FIG. 2. Line power is supplied to the unit by lines L1 and N, energization of the unit and the control means being controlled by means responsive to the liquid in aeration chamber 2, such as liquid level or float switch 36. Switch 36, along with timer 50, is connected across the lines L1 and N. When the aeration chamber is nearly full, switch 36 closes the circuit activating the first three timers, cycle timer 50. Program timer 50 operates a switch 52 for controlling the operation of valves 9 and 42, and a switch 54 for activating a second timer 56. Program timer 56 operates a switch 58 for controlling valves 12 and 25. A flow switch 27 is energized when valve 25 is opened, switch 27 controlling the operation of a valve 31 in chlorinator 28.

If it is desired also to automatically dispose of purified, treated effluent from purification chamber 26, additional circuitry will be added including a switch 60 operated by program timer 56 to energize a third timer 62. Program timer 62 operates a switch 64 for controlling the operation of valves 39 and 37.

Having described the electrical circuitry for controlling the operation of the sewage treatment plant, the operation itself will now be explained. Reference is made here to the diagram of FIG. 3 showing the sequence of operation of the various valves. It can be seen that valves 9 and 12, being normally open, are open at the beginning of the timed cycle to permit the circulation of air through aeration tank 2 when the control means is not energized. Air flow in through valve 9 and leaves through vent valve 12 so that sewage in the unit is continuously aerated unless a timer is provided on the compressor or other air source. When chamber 2 is full, float switch 36 energized timer 50. As seen in FIG. 3 air inlet valve 42 is normally closed, and air inlet valve 9 is normally open. After a purification period of, say, 15 to 30 minutes, timer 50 activates switches 52 and 54. These switches energize program timer 56, close valve 9, and open valve 42 so that air now enters above the liquid level rather than through the diffuser.

Vent valve 12 is normally open and effluent outlet valve 25 is normally closed (FIG. 3). After a settling period program timer 56, through switch 58, closes vent valve 12 and opens effluent valve 25 so that effluent is forced into the purification chamber through outlet 24. At the same time flow switch 27 is activated thereby so that it energizes a dispensing valve 31 in chemical purifier 28. As a result a measured amount of a purifying chemical such as a liquid or solid calcium hypochlorite and the like is injected into purification chamber 26. If virtually immediate emptying of the purification chamber is desired, program timer 56 will also activate timer 62 by the operation of switch 60. Program timer 62 times a chlorination cycle should it be desired to so discharge the chlorinated liquid from purification chamber 26. If desired timer 62 can be actuated by a liquid level switch such as float switch 36.

Referring again to FIG. 3 normally open purification air vent 37 is open during the operation of the aeration chamber whereas liquid outlet valve 39 is closed during this period. Since generally there is water in purification chamber 39 for flushing purposes, it is practical to have valve 38 open at all times. However, if desired, it can be made normally closed and be wired into the circuit to be opened by program timer 56. In other words it can be opened when 25 is opened.

It can be seen that this invention is designed to produce an effluent water which is continually purified without the unit being manually operated. The only attention which is required is that keeping the chemical hopper 40 full. The hopper or chlorine holding tank is provided with an alarm actuated by a float switch or other means when the hopper is less than one-fourth full. This can be constructed so that the alarm will continue to operate until the hopper is filled. Most units will be provided with pumping means conveying purified water from purification chamber 26 to the toilet for flushing. A valve in this line will be closed by the hopper switch so that the toilet cannot be flushed until the chemical hopper receives attention. Other variations and ramifications such as these will occur to those skilled in the art. For example valve 38 can be actuated and opened by flow switch 27 so that air will be introduced into purification chamber 26 at the proper time. Accordingly such obvious modifications are deemed to be within the scope of this invention.

What is claimed is:

1. Means for automatically operating an apparatus for the aerobic treatment of sewage, said apparatus being adapted for sewage purification where low, wide, units are required, said apparatus including:
   1. a closed aeration tank so elongated that the length of its longest side exceeds its height,
   2. a vertical impermeable baffle panel interposed between opposite tank walls substantially parallel to the longer side, terminating below the closed top and above the tank bottom dividing the aeration tank into a plurality of aeration chambers with communication zones in both the tank top and bottom portions,
   3. an air vent in said tank top portion,
   4. a closed purification tank,
   5. a vent in the top portion of the purification tank,
   6. effluent conduit means opening into the aeration tank above the bottom communication zone and connecting the aeration tank to the purification tank,
   7. diffuser means positioned within each tank near the tank bottom to provide oxygen for aerobic biological action, and
   8. chemical injection means operably connected to the purification tank to dispense a purifying chemical into said tank, said means for automatically operating the apparatus comprising:
      a. a normally open vent valve in said aeration tank vent (3),
      b. a normally closed valve in said effluent conduit (6),
      c. a normally open air inlet valve,
      d. a normally closed air inlet valve, e. air conduit means connecting the normally open air inlet valve to the diffuser means, and the normally closed valve to the top communication zone, f. valve means in combination with chemical injection means (8), and g. means responsive to the liquid level in the aeration tank for automatically controlling the operation of said valves through an operating cycle including a sequence of operations: closing said diffuser air inlet valve (c) to prevent flow of air to the diffuser, opening said air inlet valve (d) to admit air to the upper communication zone permitting solids to settle to the bottom of the aeration tank, opening said effluent conduit valve (b) after said settling period, closing said aeration chamber vent valve (a) forcing air into the upper portion of the tank above the liquid in the aeration tank to drive said liquid through the effluent conduit into the purification tank by virtue of the air pressure on the surface thereof without disturbing the zone of comunication beneath the baffle panel, and activating said chemical injector valve means (f) to dispense a quantity of purifying chemical into said purification tank to further purify the effluent.

2. The means of claim 1 for automatically operating the sewage treatment apparatus wherein the means (g) for automatically controlling the operation of the valves through an operating cycle include:

a first electrical control circuit, a second electrical control circuit, and liquid level responsive means, the first electrical control circuit including a first timer, electrically actuated air inlet valves (c) and (d), the liquid level responsive means, and a second timer, the second electrical control circuit including the second timer, an electrically actuated aeration tank vent valve (a), and an electrically actuated effluent conduit valve (b), said liquid level responsive means being adapted to close the first electrical control circuit when the aeration chamber is full, activating the first timer, the first timer being adapted after a purification period to activate the valves in said circuit to close the air diffuser conduit valve (c), and to open the air inlet conduit valve (d) to the upper zone and to activate a second timer, closing the second electrical control circuit, the second timer being adapted after a settling period to activate the valves in that circuit, opening the effluent conduit valve (b) and closing the aeration tank vent valve (a) forcing air within to drive said liquid into the effluent conduit, the second timer being adapted to open the first and second electrical control circuits after an emptying period, and a flow switch in the effluent conduit, said switch activating the chemical injector to dispense the purifying chemical into the purification tank.

3. The apparatus of claim 2 wherein the second timer activates a third electrical control circuit which closes a purification chamber vent valve and opens a valve in a purification chamber outlet conduit for a period sufficient to expel purified effluent from the purification tank.

4. The apparatus of claim 3 wherein the outlet conduit contains filtering means.

5. The apparatus of claim 2 wherein pumping means conveys purified effluent through a line from the purification tank to a toilet for flushing purposes.

6. The apparatus of claim 5 wherein said line contains a valve in electrical connection with the chemical injector adapted to be closed when the injector is empty.

7. The means of claim 2 wherein the chemical injector is a chlorinator, wherein a chlorine holding tank is adapted to feed a chlorine solution into the chlorinator, and wherein said tank is provided with alarm means actuated by float means when the holding tank is less than one-fourth full.

8. The means of claim 7 wherein the alarm means can be shut off only by the addition of chlorine solution to the holding tank.

* * * * *